US012264037B2

(12) United States Patent
Ito

(10) Patent No.: US 12,264,037 B2
(45) Date of Patent: Apr. 1, 2025

(54) SHEET CONVEYANCE APPARATUS AND IMAGE FORMING APPARATUS

(71) Applicant: CANON KABUSHIKI KAISHA, Tokyo (JP)

(72) Inventor: Akihiro Ito, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/358,184

(22) Filed: Jul. 25, 2023

(65) Prior Publication Data

US 2024/0034586 A1 Feb. 1, 2024

(30) Foreign Application Priority Data

Aug. 1, 2022 (JP) ................................ 2022-122811
May 24, 2023 (JP) ................................ 2023-085501

(51) Int. Cl.
*B65H 9/00* (2006.01)
*B65H 5/06* (2006.01)
*G03G 15/00* (2006.01)

(52) U.S. Cl.
CPC ............ *B65H 9/002* (2013.01); *B65H 5/062* (2013.01); *G03G 15/6567* (2013.01); *B65H 2404/14212* (2013.01); *B65H 2404/144* (2013.01)

(58) Field of Classification Search
None
See application file for complete search history.

(56) References Cited

U.S. PATENT DOCUMENTS

2024/0002182 A1* 1/2024 Aoki ........................ B65H 7/02

FOREIGN PATENT DOCUMENTS

JP 2021134050 A 9/2021

* cited by examiner

*Primary Examiner* — Leslie J Evanisko
(74) *Attorney, Agent, or Firm* — ROSSI, KIMMS & McDOWELL LLP

(57) ABSTRACT

A sheet conveyance apparatus includes a first skew correcting portion, a second skew correcting portion, an acquisition unit, a control unit. The first skew correcting portion corrects skew of a sheet by abutting a leading edge of the sheet against the first roller pair to form a bend in the sheet. The second skew correcting portion corrects skew of a sheet by conveying the sheet with a turning motion. When a first sheet with a length of a first length is conveyed, the control unit corrects the skew of the first sheet by the second skew correcting portion. When a second sheet with a length of a second length longer than the first length is conveyed, the control unit corrects the skew of the second sheet by the first skew correcting portion, and configured not to correct the skew of the second sheet by the second skew correcting portion.

14 Claims, 14 Drawing Sheets

SHEET CONVEYANCE APPARATUS AND IMAGE FORMING APPARATUS

BACKGROUND OF THE INVENTION

Field of the Invention

This disclosure relates to a sheet conveyance apparatus conveying a sheet in a copier, a facsimile, and a multifunction machine that includes a plurality of these functions, and an image forming apparatus forming an image on the sheet that has been conveyed by the sheet conveyance apparatus.

Description of the Related Art

Hitherto, in a commercial printing sector in which deliverables output from image forming apparatuses are sold as merchandise, there is a demand for image forming apparatuses with media expandability and high productivity. In particular, so as to accommodate a wide range of deliverables, for example, it is desirable to pass a media called long-sheet paper (long sheet), which exceeds standard sizes of up to about 19 inches. As a registration mechanism ensuring the high productivity and high quality, an obliquely conveying registration unit (hereinafter referred to as obliquely conveying regi) is known (refer to Japanese Patent Laid-Open No. 2021-134050). This obliquely conveying regi can correct a posture of the sheet highly accurately by obliquely conveying the sheet using an obliquely conveying roller and then abutting the sheet against a contact surface. According to this configuration, since it is possible to perform correction while conveying the sheet, it is possible to form the image without reducing the productivity.

However, with respect to the configuration described in Japanese Patent Laid-Open No. 2021-134050, upon operating the obliquely conveying regi, if the sheet is obliquely conveyed with a trailing edge of the sheet nipped by a conveyance roller pair arranged upstream of the obliquely conveying roller in a sheet conveyance direction, there is a possibility that the sheet may be twisted and stress may occur. If such stress occurs, there is a possibility that image defects may occur due to the occurrence of such as wrinkles, folds, and skew in the sheet. Therefore, in a case of conveying the sheet by the obliquely conveying roller, it is desirable to release a nip by disengaging a plurality of conveyance roller pairs arranged upstream of the obliquely conveying roller in the sheet conveyance direction. However, in a case where all of plurality of these conveyance roller pairs are provided with a disengaging drive configuration, there is a possibility that an increase in the number of components may lead to increased costs, the enlargement of the apparatus, and an increase in the complexity of a sequence. Further, since the long sheet is long in the sheet length, in a case of nipping and conveying the sheet only by the obliquely conveying roller, resistance which the sheet receives from a conveyance guide becomes large, so that there is a possibility that the wrinkles and the skew may occur.

The purpose of this disclosure is to provide a sheet conveyance apparatus and an image forming apparatus which can correct the skew of the sheet highly accurately while suppressing the increases in the size of the apparatus and the costs.

SUMMARY OF THE INVENTION

According to a first aspect of the present invention, a sheet conveyance apparatus includes a first skew correcting portion including a first roller pair configured to convey a sheet and a second roller pair disposed upstream of the first roller pair in a sheet conveyance direction and configured to convey a sheet, the first skew correcting portion being configured to correct skew of the sheet conveyed by the second roller pair by abutting a leading edge of the sheet against the first roller pair so as to form a bend in the sheet, a second skew correcting portion including a turning roller pair configured to convey a sheet, the second skew correcting portion being configured to correct skew of a sheet by conveying the sheet with a turning motion using the turning roller pair, an acquisition unit configured to acquire information on length of a sheet, and a control unit configured to control the first skew correcting portion and the second skew correcting portion based on the information on the length of a sheet acquired by the acquisition unit. In a case where a first sheet with a length of a first length is conveyed, the control unit is configured to correct the skew of the first sheet by the second skew correcting portion. In a case where a second sheet with a length of a second length that is longer than the first length is conveyed, the control unit is configured to correct the skew of the second sheet by the first skew correcting portion, and configured not to correct the skew of the second sheet by the second skew correcting portion.

According to a second aspect of the present invention, an image forming apparatus includes the sheet conveyance apparatus, and an image forming unit configured to form an image on a sheet that has been conveyed by the sheet conveyance apparatus.

Further features of the present invention will become apparent from the following description of exemplary embodiments with reference to the attached drawings.

DESCRIPTION OF THE EMBODIMENTS

Figure 1:
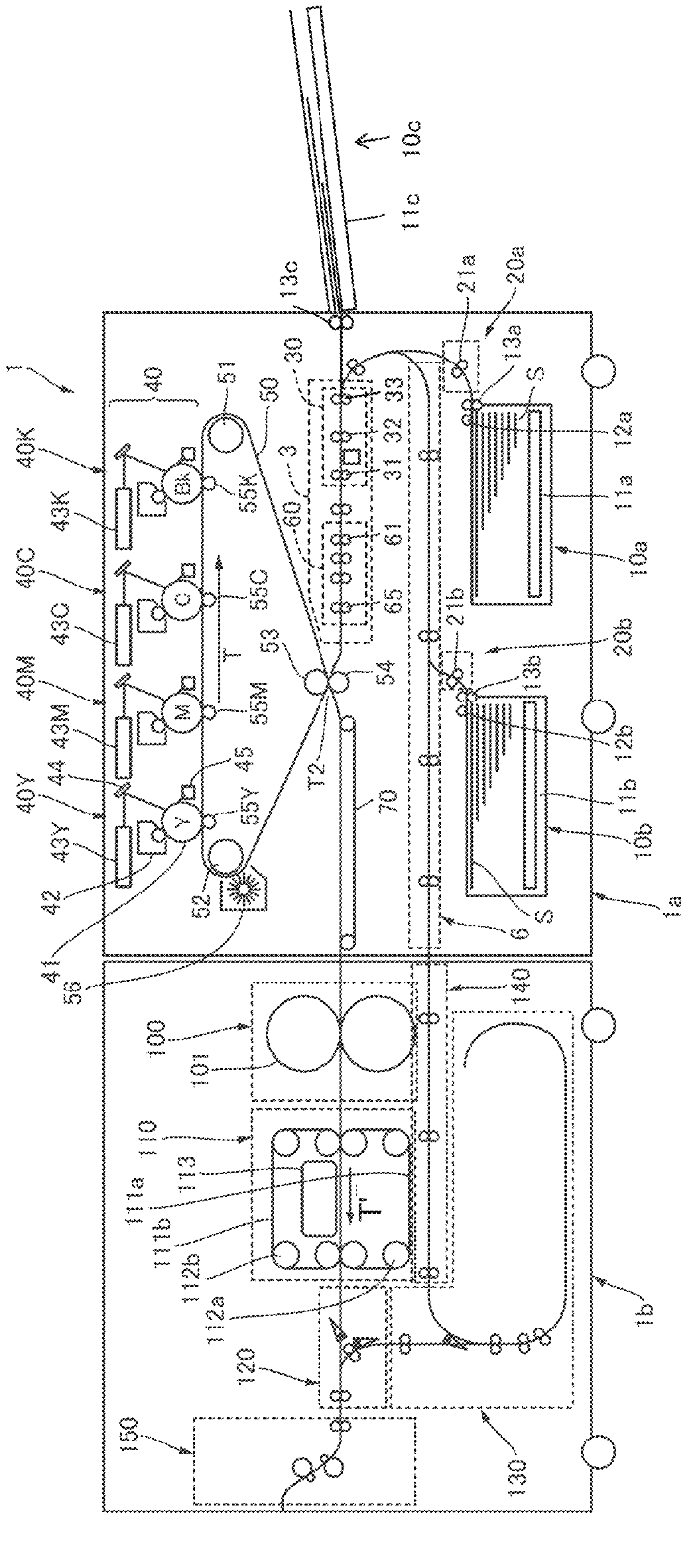
FIG. 1 is a cross-sectional view illustrating an image forming apparatus of the present embodiment.

Hereinafter, the present embodiment will be described using diagrams. First, a schematic configuration of an image forming apparatus of the present embodiment will be described using FIG. 1. FIG. 1 is a cross-sectional view illustrating the image forming apparatus of the present embodiment Schematic Configuration of Image Forming Apparatus A printer 1, serving as the image forming apparatus, is a full color laser beam printer of an electrophotographic system. As illustrated in FIG. 1, the printer 1 includes a casing 1*a* incorporating units performing a sheet feed and image formation, and a casing 1*b* incorporating units performing fixing and cooling.

The casing 1*a* includes a sheet feed units 10*a*, 10*b*, and 10*c*, extracting units 20*a* and 20*b*, a registration unit (hereinafter referred to as a regi unit 3), an image forming unit 40, serving as an image forming unit, and a first duplex conveyance path 6. The casing 1*b* includes a fixing unit 100, a cooling unit 110, a branch conveyance unit 120, a reverse conveyance unit 130, a second duplex conveyance unit 140, and a sheet discharge decurler unit 150.

The image forming unit 40 includes four process cartridges 40Y, 40M, 40C, and 40K respectively forming toner images of 4 colors, i.e., yellow (Y), magenta (M), cyan (C), and black (K), and exposing units 43Y, 43M, 43C, and 43K. To be noted, the four process cartridges 40Y, 40M, 40C, and 40K are the same in a configuration except for differences in colors of images that are formed. Therefore, only the configuration and an image forming process of the process cartridge 40Y will be described, and descriptions of the process cartridges 40M, 40C, 40K will be omitted herein.

The process cartridge 40Y includes a photosensitive drum 41, a charge roller, not shown, a developing unit 42, and a cleaner 45. The photosensitive drum 41 is constructed by coating an outer circumference of an aluminum cylinder with an organic photoconductive layer, and rotatably driven by a drive motor, not shown. Further, an intermediate transfer belt 50 rotatably driven in an arrow T direction by a drive roller 52 is disposed to the image forming unit 40, and the intermediate transfer belt 50 is wound over a tension roller 51, the drive roller 52, and a secondary transfer inner roller 53. Primary transfer rollers 55Y, 55M, 55C, 55K are disposed inside of the intermediate transfer belt 50, and a secondary transfer outer roller 54, serving as a transfer roller facing the secondary transfer inner roller 53 is disposed outside of the intermediate transfer belt 50. The intermediate transfer belt 50 is an example of an image bearing member that bears the toner image.

The sheet feed unit 10*a* includes a lift plate 11*a* ascending and descending while stacking the sheet S, a pickup roller 12*a* feeding the sheet S stacked on the lift plate 11*a*, and a separation roller pair 13*a* separating the fed sheet into one sheet at a time. Similarly, the sheet feed unit 10*b* includes a lift plate 11*b* ascending and descending while stacking the sheet S, a pickup roller 12*b* feeding the sheet S stacked on the lift plate 11*b*, and a separation roller pair 13*b* separating the fed sheet into one sheet at a time.

The sheet feed unit 10*c* includes a loading tray 11*c* capable of loading the sheet S, a separation roller pair 13*c* feeding the sheet S loaded on the loading tray 11*c* while separating the sheet into one sheet at a time, and a side edge regulation plate 14*c*. The side edge regulation plate 14*c* regulates a position of the side edge of the sheet S loaded on the loading tray 11*c*. The sheet feed units 10*a* and 10*b* are drawably disposed in an interior of the casing 1*a*, and particularly capable of storing standard-sized sheets of the sheet S. On the other hand, the sheet feed unit 10*c* is pivotably disposed on a side surface of the casing 1*a*, and openable and closable between an opening position capable of loading the sheet S and a closed position stored in the casing 1*a* along the side surface. The sheet feed unit 10*c* can feed cardboard with a large grammage of the sheet S, and a long sheet with a longer length in a sheet conveyance direction than the standard-sized sheet. Hereinafter, using a case of feeding the sheet S from the sheet feed unit 10*c* as an example, the present embodiment will be described.

The regi unit 3 includes a first skew correcting portion 30 and a second skew correcting portion 60 arranged downstream of the first skew correcting portion 30 in the sheet conveyance direction, and the regi unit 3 is an example of a sheet conveyance apparatus. On the other hand, the fixing unit 100 arranged in the casing 1*b* includes a fixing roller pair 101 capable of heating. Further, the cooling unit 110 includes an upper cooling belt 111*a* rotatably driven in an arrow T' direction by an upper cooling drive roller 112*a*. Similarly, the cooling unit 110 includes a lower cooling belt 111*b* rotatably driven in the arrow T' direction by a lower cooling drive roller 112*b*. Further, so as to cool the sheet, the cooling unit 110 includes a heat sink 113.

Image Forming Operation

Next, an image forming operation of the printer 1 configured as described above will be described. For example, when an image signal is input from a computer 300 (refer to FIG. 2), such as an external personal computer, to the exposing unit 43Y, a laser beam corresponding to the image signal is emitted from the exposing unit 43Y onto the photosensitive drum 41 of the process cartridge 40Y.

At this time, a surface of the photosensitive drum 41 has been uniformly charged to a predetermined polarity and potential beforehand by the charge roller, not shown, and, by being irradiated with the laser beam from the exposing unit 43Y via a mirror 44, an electrostatic latent image is formed on the surface. The electrostatic latent image formed on the photosensitive drum 41 is developed by the developing unit 42, and the toner image of yellow (Y) is formed on the photosensitive drum 41.

Similarly, the laser beam is emitted also onto each of the photosensitive drums of the process cartridges 40M, 40C, and 40K from the exposing units 43M, 43C, and 43K, and the toner images of magenta (M), cyan (C), and black (K) are formed on the respective photosensitive drums. The toner image of each color formed on each of the photosensitive drums is transferred onto the intermediate transfer belt 50 by the primary transfer rollers 55Y, 55M, 55C, and 55K. Then, a full color toner image is conveyed to a secondary transfer nip T2, formed by the secondary transfer inner and outer rollers 53 and 54, by the intermediate transfer belt 50 rotatably driven by the drive roller 52. The toner remained on the photosensitive drum 41 is collected by the cleaner 45. To be noted, the image forming process of each color is performed in a timing superimposing the toner image on an upstream toner image that has been primarily transferred onto the intermediate transfer belt 50.

In parallel with this image forming process, the sheet S is fed from one of the sheet feed units 10*a*, 10*b*, and 10*c*, and is conveyed to the regi unit 3 by one of the extracting units 20*a* and 20*b* and the separation roller pair 13*c*. Extracting units 20*a* and 20*b* may include conveyance roller pairs 21*a* and 21*b*, respectively. The first and second skew correcting portions 30 and 60 are disposed in the regi unit 3. The positional displacement and the skew of the sheet S are corrected by the regi unit 3, and, in synchronization with a timing in which the full color toner image formed on the intermediate transfer belt 50 reaches the secondary transfer nip T2, the sheet S is conveyed to the secondary transfer nip T2. Then, the full color toner image on the intermediate transfer belt 50 is transferred onto a first sheet surface (front surface) of the sheet S by applying a secondary transfer bias to the secondary transfer outer roller 54. That is, the secondary transfer nip T2 is an example of a transfer unit that transfers the toner image borne on the intermediate transfer belt 50 onto the sheet S. To be noted, the toner remained on the intermediate transfer belt 50 is collected by a belt cleaner 56. As described above, the image forming unit 40 forms the image on the sheet S that has been conveyed by the regi-unit 3.

The sheet S onto which the toner image has been transferred is conveyed to the fixing unit 100 by a pre-fixing conveyance unit 70. Then, the sheet S is guided to a nip of the fixing roller pair 101, and predetermined heat and pressure are applied so as to melt and bond (fix) the toner. The sheet S having passed through the fixing unit 100 is nipped by the lower and upper cooling belts 111*a* and 111*b*, which are endless belts, and is conveyed by the rotation of the lower and upper drive rollers 112*a* and 112*b*. Then, the sheet S is brought into contact with the heat sink 113 via the upper cooling belt 111*b*, and is cooled by transferring the heat to the heat sink 113.

Subsequently, the path selection of conveying to either the sheet discharge decurler unit 150 or the reverse conveyance unit 130 is performed by the branch conveyance unit 120. To be noted, after having conveyed the sheet S to the reverse conveyance unit 130, it is also possible to convey the sheet S to the sheet discharge decurler unit 150 by inverting the sheet S such that the first sheet surface, on which the image has been formed in the secondary transfer nip T2, becomes a lower side.

In a case where the image is formed only on one side of the sheet S, the sheet S is conveyed from the branch conveyance unit 120 to the sheet discharge decurler unit 150, and a curl of the sheet S is corrected by small diameter hard rollers and large diameter soft rollers. Subsequently, the sheet S having passed through the sheet discharge decurler unit 150 is either discharged outside of the apparatus or delivered to a sheet discharge optional apparatus, not shown.

In a case where the image formation is performed on both surfaces of the sheet S, the sheet S is conveyed to the reverse conveyance unit 130 by the branch conveyance unit 120, and is switchbacked in the reverse conveyance unit 130. The switchbacked sheet S is conveyed from the reverse conveyance unit 130 to the second duplex conveyance unit 140 and the first duplex conveyance unit 6, and is guided to the regi unit 3. Thereafter, the image is formed on a second surface (back surface) of the sheet S in the secondary transfer nip T2, and, then, via the branch conveyance unit 120 and the sheet discharge decurler unit 150, the sheet S is either discharged outside of the apparatus or delivered to the sheet discharge optional apparatus, not shown.

Configuration of Control System

Figure 2:
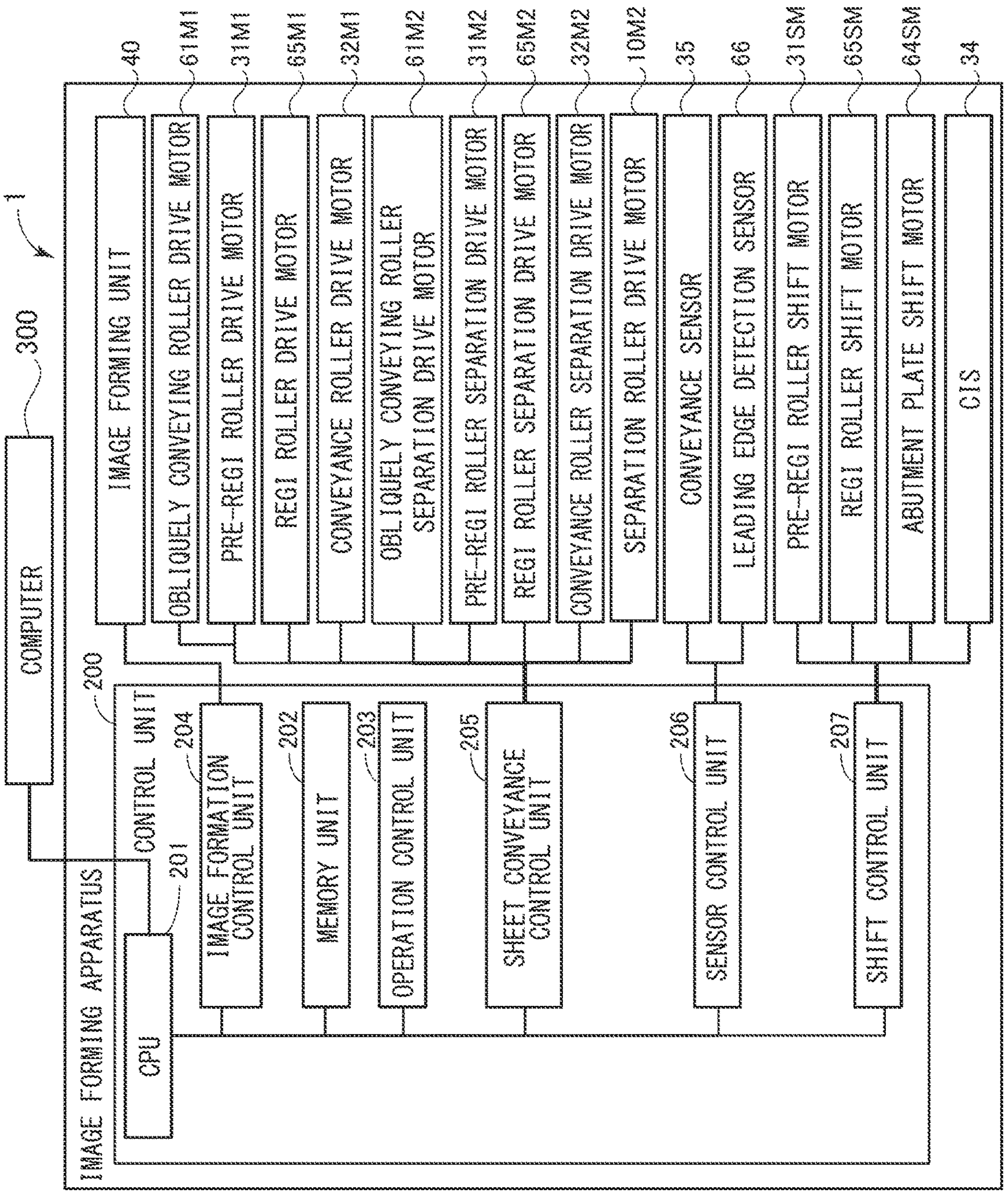
FIG. 2 is a block diagram illustrating a control system of the image forming apparatus of the embodiment.

Next, a configuration of a control system in the printer 1 will be described using FIG. 2. FIG. 2 is a block diagram illustrating the control system of the image forming apparatus of the present embodiment.

The printer 1 includes a control unit 200. Devices such as the computer 300 and various sensors are connected to that control unit 200 so as to be allowed to input a signal, and devices such as the image forming unit 40 and various motors are connected controllably.

The control unit 200 includes hardware configurations such as a central processing unit (CPU) 201, a random access memory (RAM), and a read only memory (ROM), while the RAM and ROM are not shown. In the control unit 200, these hardware configurations are configured such that a memory unit 202, an operation control unit 203, an image formation control unit 204, a sheet conveyance control unit 205, a sensor control unit 206, and a shift control unit 207 perform their respective functions using such as a program.

The memory unit 202 can temporarily store various signals and data. The operation control unit 203 is connected to an operation unit such as an operation panel, not shown, disposed in the printer 1, and performs control such as inputting a signal from the operation unit and displaying an image. The image formation control unit 204 is connected to the image forming unit 40, and controls the image forming unit 40. The image formation control unit 204 sends the image signal contained in such as a print job sent from, for example, the computer 300 to the image forming unit 40, and, while controlling each process cartridge, forms the toner image on the intermediate transfer belt 50 as described above.

The sheet conveyance control unit 205 is connected to such as an obliquely conveying roller drive motor 61M1, a pre-regi roller drive motor 31M1, a regi roller drive motor 65M1, a conveyance roller drive motor 32M1, and a separation roller drive motor 10M2, and controls these motors. The obliquely conveying roller drive motor 61M1 is a motor driving each of drive rollers of a plurality of obliquely conveying roller pairs 61, 62, and 63, and, including driving and stopping of the obliquely conveying roller pairs 61, 62, and 63, feely controls rotational speeds (that is, sheet conveyance speed) of these roller pairs. The pre-regi roller drive motor 31M1 is a motor driving a drive roller of a pre-regi roller pair 31 (pre-registration roller pair) of the regi unit 3. The pre-regi roller drive motor 31M1, including driving and stopping of the pre-regi roller pair 31, feely controls rotational speed (that is, sheet conveyance speed) of the pre-regi roller pair. The regi roller drive motor 65M1 is a motor driving a drive roller of a regi roller pair 65 (registration roller pair) of the regi unit 3, and, including driving and stopping of the regi roller pair 65, feely controls rotational speed (that is, sheet conveyance speed) of the regi roller pair. The conveyance roller drive motor 32M1 is a motor driving each of drive rollers of a plurality of conveyance roller pairs 32 and 33, and, including driving and stopping of the conveyance roller pairs 32 and 33, feely controls rotational speeds (that is, sheet conveyance speed) of the conveyance roller pairs. The separation roller drive motor 10M2 is a motor driving the separation roller pair 13*c* of the sheet feed unit 10*c*. The separation roller drive motor 10M2, including driving and stopping of the separation roller pair 13*c*, feely controls rotational speed (that is, sheet conveyance speed) of the separation roller pair. That is, in the printer 1 of the present embodiment, it is possible to freely and independently control the rotational speeds of the pre-regi roller pair 31, the regi roller pair 65, the plurality of obliquely conveying roller pairs 61, 62, and 63, the plurality of conveyance roller pairs 32 and 33, and the separation roller pair 13*c* using the motors that are different from each other.

Further, the sheet conveyance control unit 205 is connected to such as an obliquely conveying separation drive motor 61M2, a pre-regi roller separation drive motor 31M2, a regi roller separation drive motor 65M2, and a conveyance roller separation drive motor 32M2, and controls these motors. The obliquely conveying separation drive motor 61M2 performs driving so as switch the drive and driven rollers of the plurality of obliquely conveying roller pairs 61, 62, and 63 between a nipping conveying state and a non-nipping state. Here, the nipping conveying state refers to a state in which the drive and driven rollers of the plurality of obliquely conveying roller pairs 61, 62, and 63 are brought into pressure contact with each other so as to nip and convey the sheet S, and the non-nipping state refers to a state in which the drive and driven rollers are disengaged from each other so as to release a nip of the sheet S. The pre-regi roller separation drive motor 31M2 performs driving so as to switch the drive and driven rollers of the pre-regi roller pair 31 between the nipping conveying state in which the drive and driven rollers are brought into pressure contact with each other so as to nip and convey the sheet S and the non-nipping state in which the drive and driven rollers are disengaged from each other so as to release the nip of the sheet S. The regi roller separation drive motor 65M2 performs driving so as to switch the drive and driven rollers of the regi roller pair 65 between the nipping conveying state in which the drive and driven rollers are brought into pressure contact with each other so as to nip and convey the sheet S and the non-nipping state in which the drive and driven rollers are disengaged from each other so as to release the nip of the sheet S. The conveyance roller separation drive motor 32M2 performs driving so as switch the drive and driven rollers of the conveyance roller pairs 32 and 33 between the nipping conveying state in which the drive and driven rollers are brought into pressure contact with each other so as to nip and convey the sheet S and the non-nipping state in which the drive and driven rollers are disengaged from each other so as to release the nip of the sheet S. By drive controlling these motors, while performing the correction of the skew of the sheet S, the sheet conveyance control unit 205 conveys the sheet to the secondary transfer nip T2 in synchronization with a timing of the toner image on the intermediate transfer belt 50.

The sensor control unit 206 is an example of an acquisition unit that acquires information on the length of the sheet S, and, by being connected to sensors such as a conveyance sensor 35 and a leading edge detection sensor 66, inputs signals from these sensors. Since, in the regi-unit 3, the conveyance sensor 35 and the leading edge detection sensor 66 input the signals, the sensor control unit 206 can acquire information on a position and the length of the sheet S.

The shift control unit 207 is connected to an abutment plate shift motor 64SM, a pre-regi roller shift motor 31SM, and a regi roller shift motor 65SM, and performs the drive control of these motors. The abutment plate shift motor 64SM performs the drive control of an abutment plate 64 in a width direction perpendicular to the sheet conveyance direction. A pre-regi roller shift motor 31SM performs the drive control of the pre-regi roller pair 31 in the width direction. A regi roller shift motor 65SM is an example of a moving unit that performs drive control so as to move the regi roller pair 65 in the width direction.

Details of Registration Unit

Figure 3:
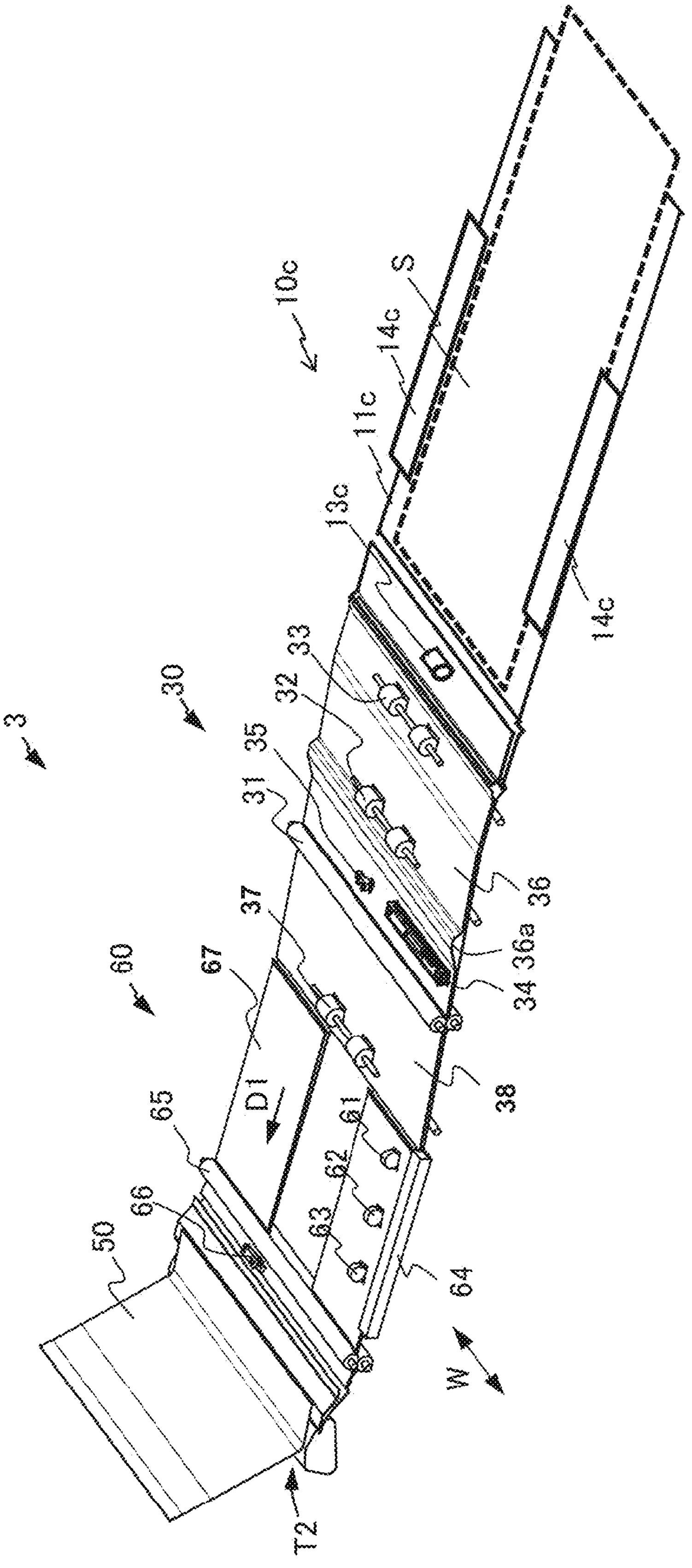
FIG. 3 is a perspective view illustrating a regi unit of the embodiment.
Figure 4:
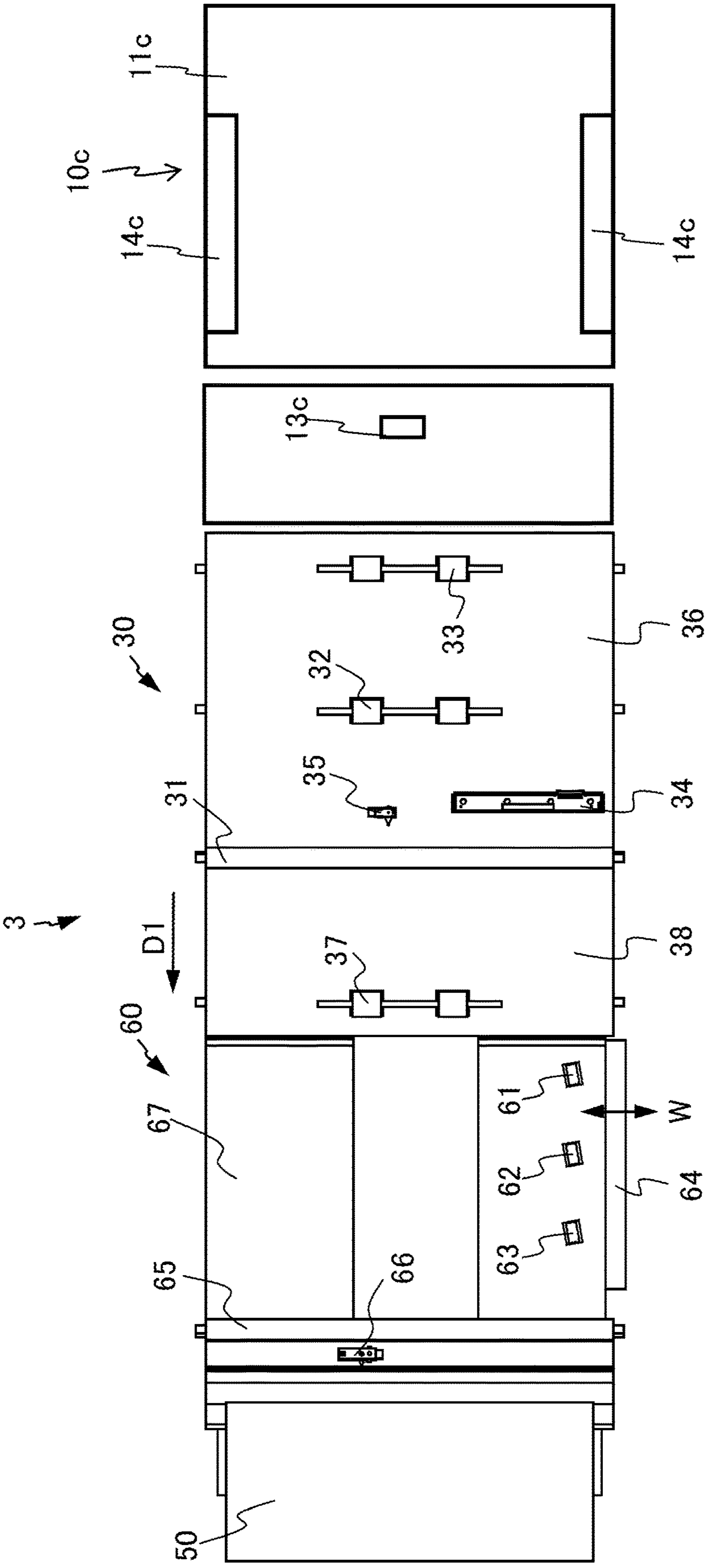
FIG. 4 is a plan view illustrating the regi unit of the embodiment.
Figure 5:
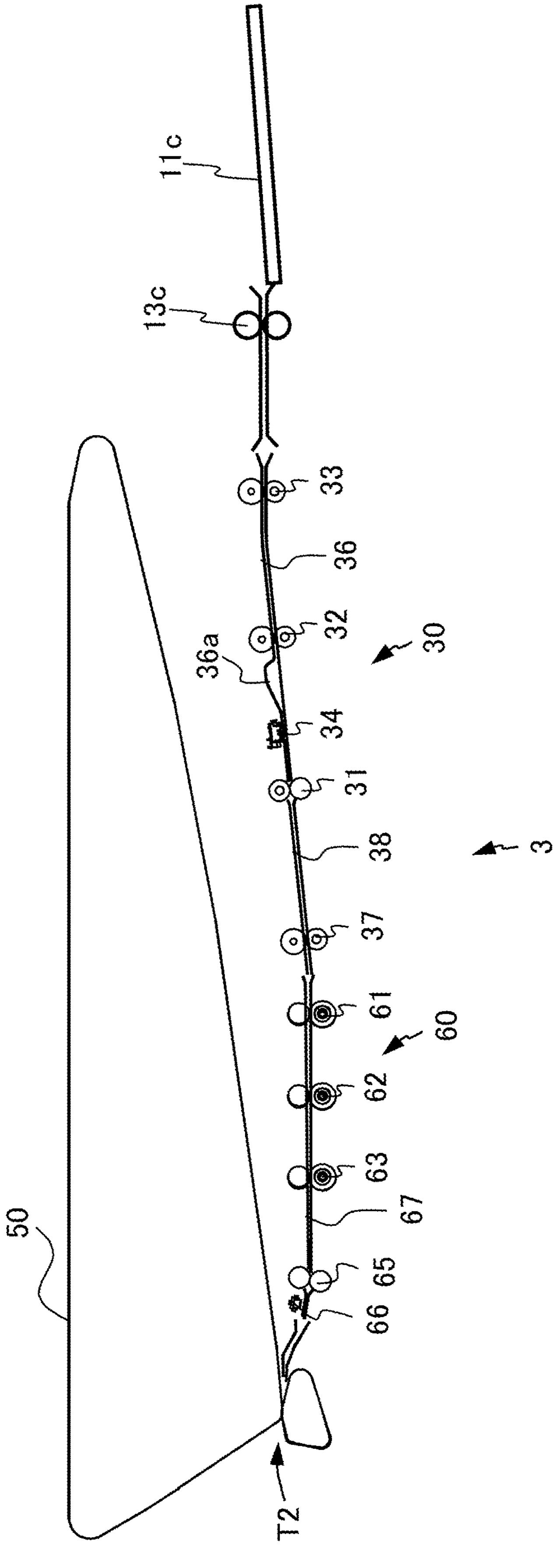
FIG. 5 is a cross-sectional view illustrating the regi unit of the embodiment.

Hereinafter, a configuration of the regi unit 3 of the present embodiment will be described. FIGS. 3, 4, and 5 are respectively a perspective view, plan view, and cross-sectional view illustrating the regi unit 3. To be noted, in the printer 1 of the present embodiment, as an example, a center referenced sheet conveyance system is adopted, so that the sheet is conveyed by aligning a center of the sheet in the width direction with a center of the sheet conveyance path in a direction perpendicular to the sheet conveyance direction. The regi unit 3 includes the first and second skew correcting portions 30 and 60. The first skew correcting portion 30 is arranged upstream of the second skew correcting portion 60 in the sheet conveyance direction D1.

The first skew correcting portion 30 includes the pre-registration roller pair (hereinafter, abbreviated to a pre-regi roller pair 31), the conveyance roller pairs 32 and 33, a contact image sensor (CIS) 34 that is a contact image sensor, the conveyance sensor 35, and a conveyance guide 36. The pre-regi roller pair 31 is an example of a first roller pair, and the conveyance roller pairs 32 and 33 are examples of a second roller pair that is arranged upstream of the pre-regi roller pair 31 in the sheet conveyance direction and convey the sheet S. The first skew correcting portion 30 can perform a first skew correcting operation of conveying the sheet S by starting the rotation of the pre-regi roller pair 31 after the leading edge of the sheet S, which was conveyed by the conveyance roller pairs 32 and 33, has abutted against the pre-regi roller pair 31.

Each roller pair nips the sheet S by the drive and driven rollers and conveys the sheet S downstream in the sheet conveyance direction D1. That is, the pre-regi roller pair 31 and the conveyance roller pairs 32 and 33 each can make the transition between the nipping conveying state in which the sheet S is nipped and conveyed and the non-nipping state in which the nip of the sheet S is released. Each drive roller rotates by receiving the drive from the drive motors 31M1 and 32M1 via transmission gears, not shown, and acquires power for sending the sheet S in the conveyance direction. Further, each roller pair can release the nip by receiving the drive from the separation drive motors 31M2 and 32M2 via transmission gears, not shown, so as to disengage the roller pairs. The pre-regi roller pair 31 can be moved in the width direction W perpendicular to the sheet conveyance direction D1 by receiving the drive from the pre-regi roller shift motor 31SM via a transmission gear, not shown, and changes a position depending on the length of the sheet S in the width direction W.

The second skew correcting portion 60 includes the obliquely conveying roller pairs 61, 62, and 63, the abutment plate 64, the regi roller pair 65, the leading edge detection sensor 66, and a conveyance guide 67. The abutment plate 64 is an example of a contact surface that extends along the sheet conveyance direction and is capable of coming into contact with an end in the width direction of the sheet S. The regi roller pair 65 is an example of a third roller pair that is arranged downstream of the obliquely conveying roller pairs 61, 62, and 63 in the sheet conveyance direction. The obliquely conveying roller pairs 61, 62, and 63 are examples of a turning roller pair that moves the sheet S in a direction inclined with respect to the sheet conveyance direction so as to approach the abutment plate 64 with respect the width direction toward downstream in the sheet conveyance direction. The second skew correcting portion 60 can perform a second skew correcting operation by moving the sheet S along the abutment plate 64 so as to correct the skew of the sheet S and convey the sheet.

Each roller pair nips the sheet S by the drive and driven rollers, and convey the sheet S downstream in the sheet conveyance direction D1. That is, the obliquely conveying roller pairs 61, 62, and 63 and the regi roller pair 65 can make the transition between the nipping conveying state in which the sheet S is nipped and conveyed and the non-nipping state in which the nip of the sheet S is released. Each drive roller rotates by receiving the drive from the drive motors 61M1 and 65M1 via transmission gears, not shown, and acquires power to send the sheet S in the conveyance direction. Further, each roller pair can release the nip by receiving the drive from the separation drive motors 61M2 and 65M2 via transmission gears, not shown, so as to disengage the roller pairs. The regi roller pair 65 can move in the width direction perpendicular to the sheet conveyance direction D1 by receiving the drive from the regi roller shift motor 65SM via a transmission gear, not shown, and changes a position depending on the length of the sheet S in the width direction. The abutment plate 64 can move in the width direction by receiving the drive from the abutment plate shift motor 64SM via a transmission gear, not shown, and changes a position depending on the length of the sheet S in the width direction.

The secondary transfer nip T2 (refer to FIG. 1) formed by the secondary transfer outer roller 54 and the intermediate transfer belt 50 is arranged downstream of the regi roller pair 65 in the sheet conveyance direction D1, and transfers the image onto the sheet S. That is, the second skew correcting portion 60 is arranged upstream of the image forming unit 40 in the sheet conveyance direction, and the regi unit 3 conveys the sheet S to the secondary transfer nip T2. To be noted, in the present embodiment, a conveyance roller 37 and a conveyance guide 38 are disposed between the first and second skew correcting portions 30 and 60 in the sheet conveyance direction. However, it is acceptable to eliminate the conveyance roller 37 and the conveyance guide 38 by closely arranging the first and second skew correcting portions 30 and 60 in the sheet conveyance direction in the sheet conveyance direction.

Registration Correction (not-Long Sheet)

Hereinafter, the registration correction of a not-long sheet will be described. Here, the not-long sheet refers to a standard-sized sheet such as, for example, an A4 size sheet with a length in the sheet conveyance direction of equal to less than about 30 inches. However, needless to say, the not-long sheet is not limited to the standard-sized sheet. Based on the information on the length of the sheet S acquired by the sensor control unit 206, the control unit 200 controls the first and second skew correcting portions 30 and 60.

Figure 6A:
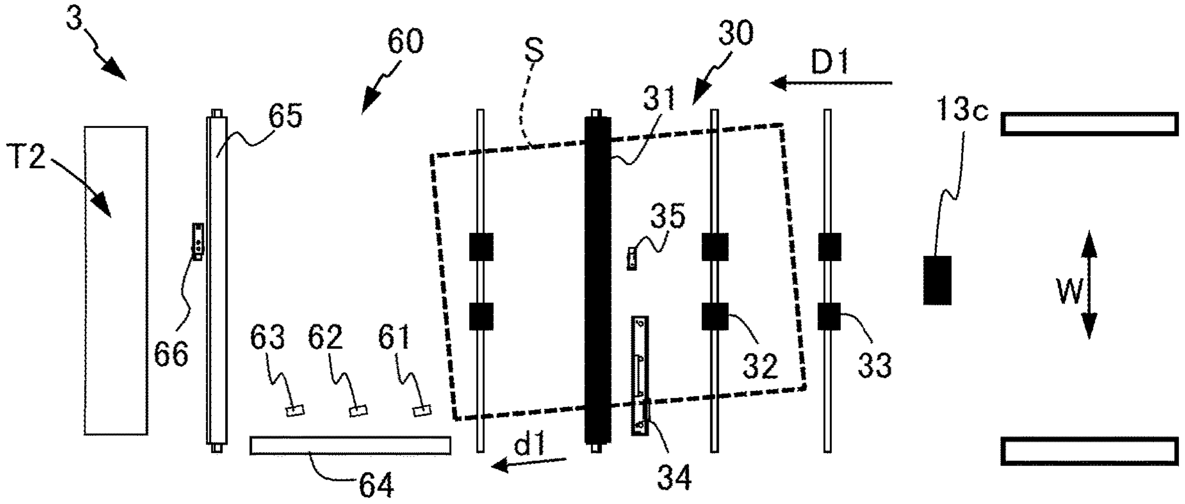
FIG. 6A is a plan view illustrating a state in which a leading edge of a not-long sheet has reached a second skew correcting portion in the regi unit of the embodiment.

FIGS. 6A to 7B are plan views illustrating the regi unit 3, and illustrate a skew correcting operation of the not-long sheet of the sheet S in chronological order. Further, traveling directions of the sheet S in the chronological order are shown by arrow directions d1, d2, d3, and d4. Here, regarding the plan views of the rollers in FIGS. 6A to 7B, the black-colored (filled) rollers represent the rollers in the nipping conveying state in which the sheet is nipped and conveyed, and the white-colored rollers indicate the rollers in the non-nipping state in which the nip of the sheet S is released. As illustrated in FIG. 6A, the control unit 200 conveys the sheet S by bringing the pre-regi roller pair 31 into the nipping conveying state. When the sheet S has reached the obliquely conveying roller pairs 61, 62, and 63 in a skewed state, the sheet S is brought into contact with the abutment plate 64 by the force of the obliquely conveying roller pairs 61, 62, and 63 applied in the width direction perpendicular to the conveyance direction.

Figure 6B:
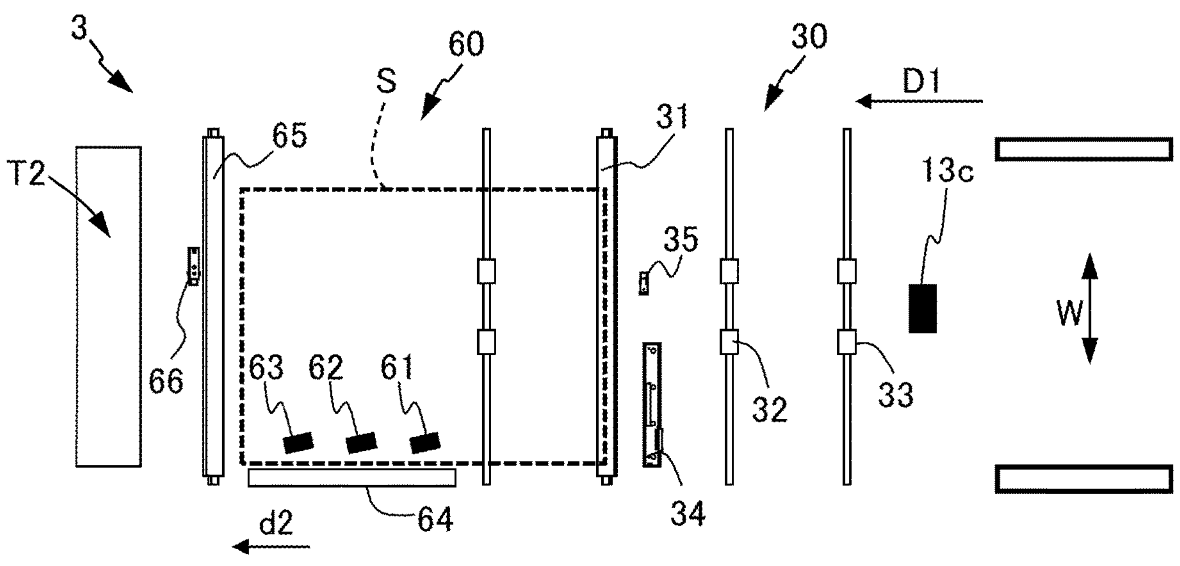
FIG. 6B is a plan view illustrating a state in which the skew of the not-long sheet has been corrected by the second skew correcting portion in the regi unit of the embodiment.

As illustrated in FIG. 6B, since, at a time when the sheet is brought into contact with the abutment plate 64 by the obliquely conveying roller pairs 61, 62, and 63, the sheet S receives the reaction force of contact force from the abutment plate 64, and slips and rotates so as to follow the abutment plate 64, so that the skew is corrected. To be noted, a position of the abutment plate 64 is adjusted based on information on an end position of the sheet S read by the CIS 34 disposed upstream of the obliquely conveying roller pairs 61, 62, and 63 in the sheet conveyance direction. After a leading edge of the sheet has reached the obliquely conveying roller pairs 61, 62, and 63, the control unit 200 brings the pre-regi roller pair 31 into the non-nipping state. Further, after the leading edge of the sheet conveyed by the pre-regi roller pair 31 has reached the obliquely conveying roller pairs 61, 62, and 63, the control unit 200 brings the conveyance roller pairs 32 and 33 into the non-nipping state. That is, at a time when the skew is corrected by the obliquely conveying roller pairs 61, 62, and 63, the pre-regi roller pair 31 and the conveyance roller pairs 32 and 33 arranged upstream of the obliquely conveying roller pairs in the sheet conveyance direction have been disengaged so as to release the nip beforehand. Since, by disengaging the roller pairs, when the sheet is moved in the width direction and rotated by the obliquely conveying roller pairs, the sheet S does not receive resistance from a roller nip, it becomes possible to avoid the occurrence of wrinkles and folds in the sheet S.

Figure 7A:
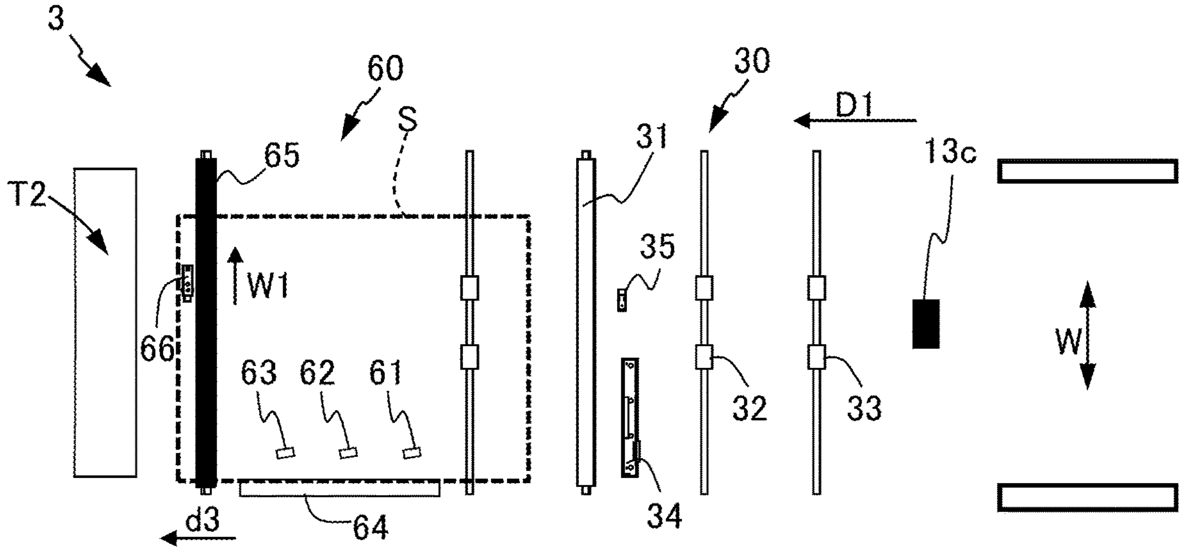
FIG. 7A is a plan view illustrating a state in which the leading edge of the not-long sheet is nipped by a regi roller pair in the regi unit of the embodiment.

As illustrated in FIG. 7A, when the leading edge of the sheet S has reached the regi roller pair the regi roller pair 65 is laterally shifted in the width direction W indicated by an arrow W1 direction in FIG. 7A so as to align a position in the width direction of the sheet S with a position in the width direction of the image conveyed to the secondary nip T2. Further, by comparing a detection result of the leading edge of the sheet S in the conveyance direction detected by the leading edge detection sensor 66 with a timing of the image conveyed to the secondary nip T2, a speed or the timing, or both of the speed and the timing of the regi roller pair 65 are controlled such that positions of the leading edges of the image and the sheet S are aligned. At a time of shifting the lateral registration of the sheet S, so as not to apply unnecessary force, also the obliquely conveying roller pairs 61, 62, and 63 are disengaged so as to release the nip.

Figure 7B:
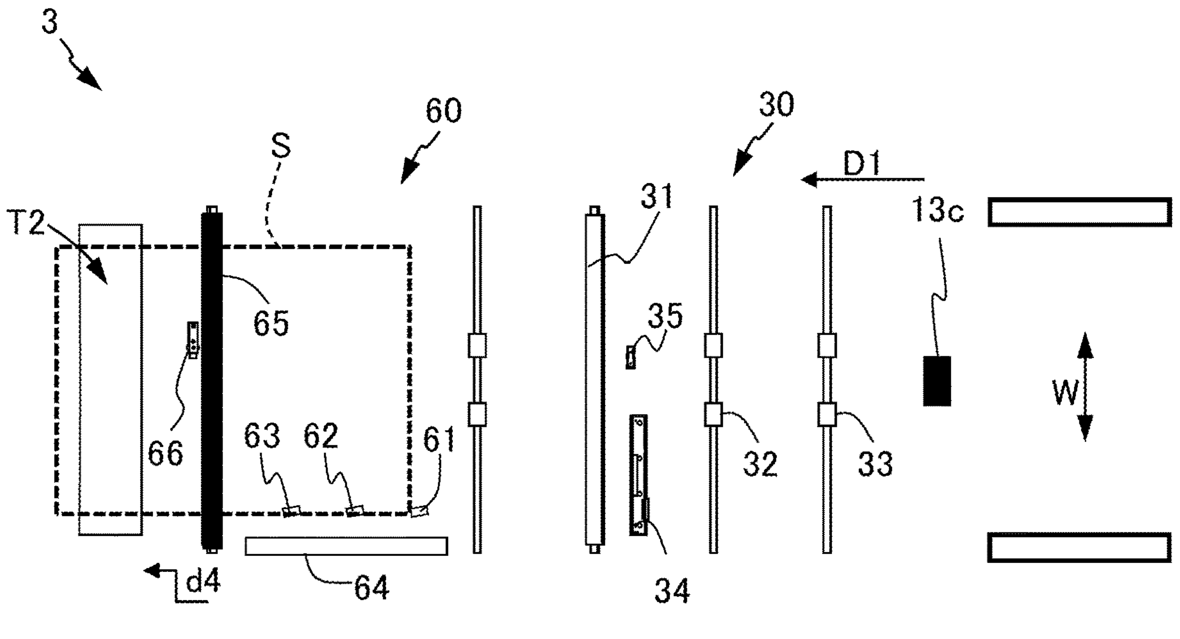
FIG. 7B is a plan view illustrating a state in which the leading edge of the not-long sheet reaches a secondary transfer nip of the embodiment.

As illustrated in FIG. 7B, when the sheet S has been conveyed to the second transfer nip T2, also the regi roller pair is disengaged, and all of upstream roller pairs in the sheet conveyance direction are brought into the state in which the nip is released. Since, by disengaging all of the upstream roller pairs, the secondary transfer nip T2 does not receive force from any of the upstream roller pairs via the sheet S, it is possible to accurately convey the sheet S while transferring the image onto the sheet S. That is, in a case of conveying the not-long sheet whose length in the sheet conveyance direction is equal to or less than a predetermined length (for example, equal to or less than 30 inches), the control unit 200 performs the second skew correcting operation in which the skew is corrected by moving the sheet S along the abutment plate 64 using the second skew feed correction portion 60. In the second skew correcting operation performed by the second skew correcting portion 60, the control unit 200 controls such that the regi roller pair 65 nips the sheet S which has been moved along the abutment plate 64. Then, using the regi roller shift motor 65SM, a position in the width direction of the sheet nipped by the regi roller pair 65 is corrected as illustrated by the arrow d4 in FIG. 7B. Further, in the case of conveying the not-long sheet, in the second skew correcting operation by the second skew correcting portion 60, the control unit 200 changes the sheet conveyance speed of the regi roller pair 65 corresponding to a timing of the image formation by the image forming unit 40. The timing here refers to, for example, a timing in which the toner image reaches the secondary transfer nip T2.

Registration Correction (Long Sheet)

Figure 8A:
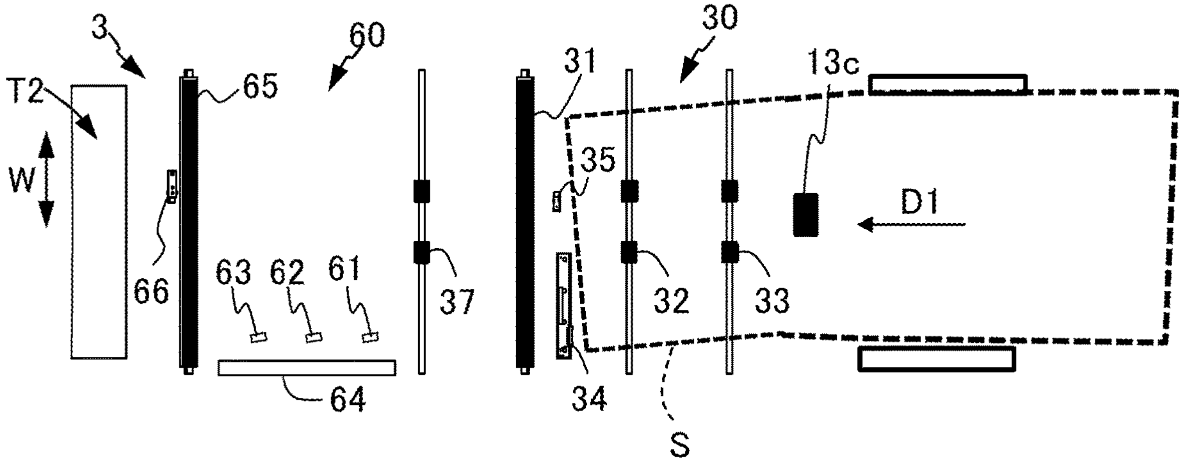
FIG. 8A is a plan view illustrating a state immediately before a leading edge of a long sheet reaches a pre-regi roller pair in the regi unit of the embodiment.
Figure 8B:
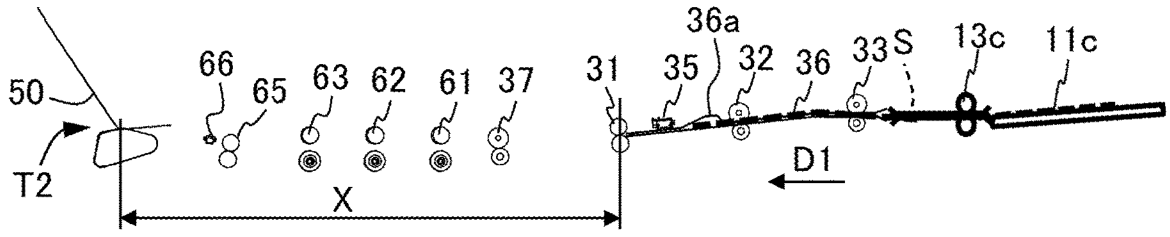
FIG. 8B is a cross-sectional view illustrating the state immediately before the leading edge of the long sheet reaches the pre-regi roller pair in the regi unit of the embodiment.
Figure 9A:
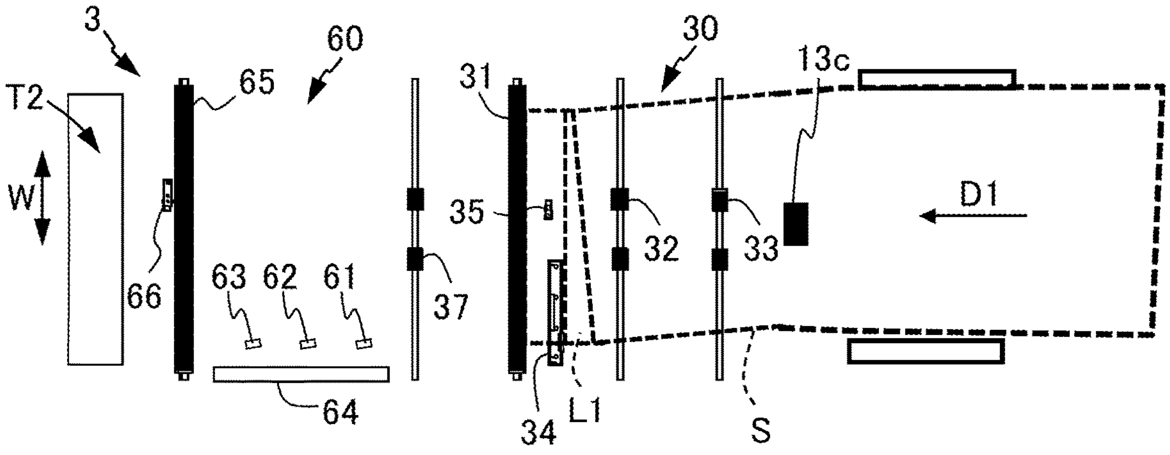
FIG. 9A is a plan view illustrating a state in which, in the regi unit of the embodiment, the leading edge of the long sheet has reached the pre-regi roller pair and has formed a loop.
Figure 9B:
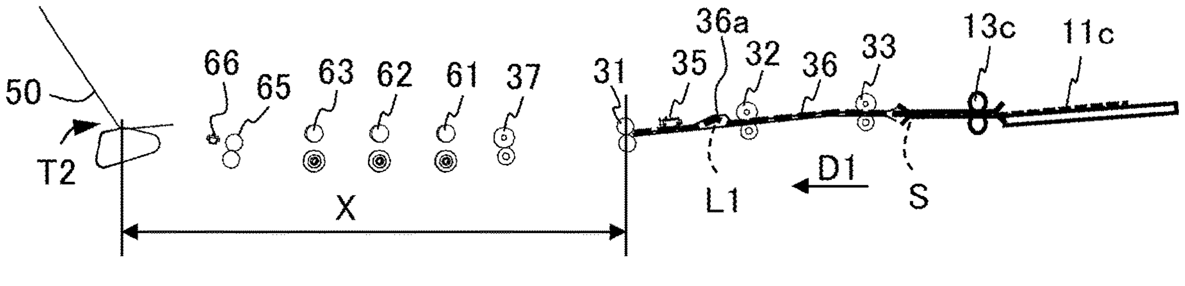
FIG. 9B is a cross-sectional view illustrating the state in which, in the regi unit of the embodiment, the leading edge of the long sheet has reached the pre-regi roller pair and has formed the loop.
Figure 10A:
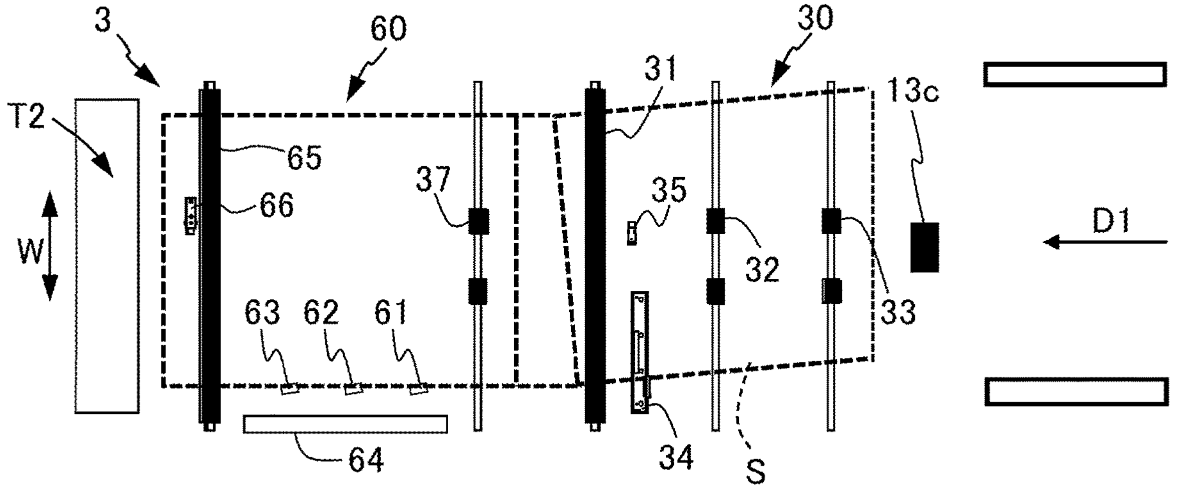
FIG. 10A is a plan view illustrating a state immediately before the leading edge of the long sheet reaches the secondary transfer nip of the embodiment.
Figure 10B:
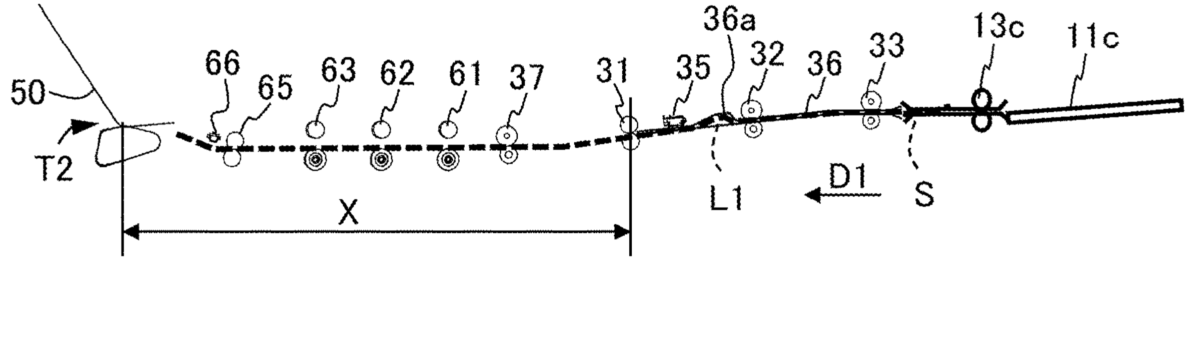
FIG. 10B is a cross-sectional view illustrating the state immediately before the leading edge of the long sheet reaches the secondary transfer nip of the embodiment.

Next, the registration correction of the long sheet will be described. FIGS. 8A, 9A, and 10A are plan views illustrating the regi unit 3, and FIGS. 8B, 9B, and 10B are cross-sectional views illustrating the regi unit 3. FIGS. 8A to 10B illustrate the skew correcting operation of the sheet S in a case of the long sheet in the chronological order. Here, regarding the plan views of rollers in FIGS. 8A, 9A, and 10A, the black-colored (filled) rollers represent the rollers in the nipping conveying state in which the sheet is nipped and conveyed, and the white-colored rollers indicate the rollers in the non-nipping state in which the nip of the sheet S is released. As illustrated in FIGS. 8A and 8B, when the leading edge of the sheet S has reached the pre-regi roller pair 31, for a duration of a predetermined time which is measured using a detection position of the conveyance sensor 35 as a reference, the drive of the pre-regi roller pair 31 is stopped, and the leading edge of the sheet S is abutted against a nip portion of the pre-regi roller pair 31. At this time, since the conveyance roller pairs 32 and 33 farther upstream than the pre-regi roller pair 31 in the sheet conveyance direction are driving, the sheet S forms a bend (loop) L1 as illustrated in FIGS. 9A and 9B. By receiving the reaction force of the loop L1 that has been formed, the leading edge of the sheet S pivots around the pre-regi roller pair 31 as a starting point, and the leading edge of the sheet S follows an axial direction (that is, width direction W) of the pre-regi roller pair 31, so that the skew of the sheet is corrected.

Here, in the conveyance guide 36 positioned upstream of the pre-regi roller pair 31 in the sheet conveyance direction, a bend space portion 36*a* that is a loop space for partly expanding a cross section of the conveyance unit is disposed. Thereby, since the loop L1 is formed in the sheet S as the bend (curve), the occurrence of the wrinkles and folds in the sheet S are prevented. That is, the first skew correcting portion 30 includes the bend space portion 36*a* for forming the loop L1 of the sheet S generated at a time of the abutment of the sheet S against the pre-regi roller pair 31. To be noted, in the present embodiment, a sheet conveyance path of the first skew correcting portion 30 is in a substantially horizontal shape, and the bend space portion 36*a* is disposed above the sheet conveyance path. However, it is acceptable that the bend space portion 36*a* is disposed below the sheet conveyance path.

The pre-regi roller pair 31 is arranged farther upstream than the obliquely conveying roller pairs 61, 61, and 63 in the sheet conveyance direction, and performs registration correction. That is, in a case of conveying the long sheet whose length in the sheet conveyance direction is longer than the predetermined length (for example, 30 inches), the control unit 200 performs a first skew correcting operation using the first skew correcting portion 30. As illustrated in FIGS. 10A and 10B, in the case of conveying the long sheet, the control unit 200 brings the obliquely conveying roller pairs 61, 61, and 63 into the non-nipping state. Thereby, the sheet whose skew has been corrected is straightly conveyed to the secondary transfer nip T2.

As described above, in the present embodiment, in the case of conveying the long sheet, the skew of the sheet is corrected by abutting the leading edge of the sheet against the pre-regi roller pair 31 using the first skew correcting portion 30. On the other hand, in the case of conveying the not-long sheet, the skew of the sheet is corrected using the second skew correcting portion 60, while conveying the sheet, by abutting the side edge of the sheet against the abutment plate.

Figure 12:
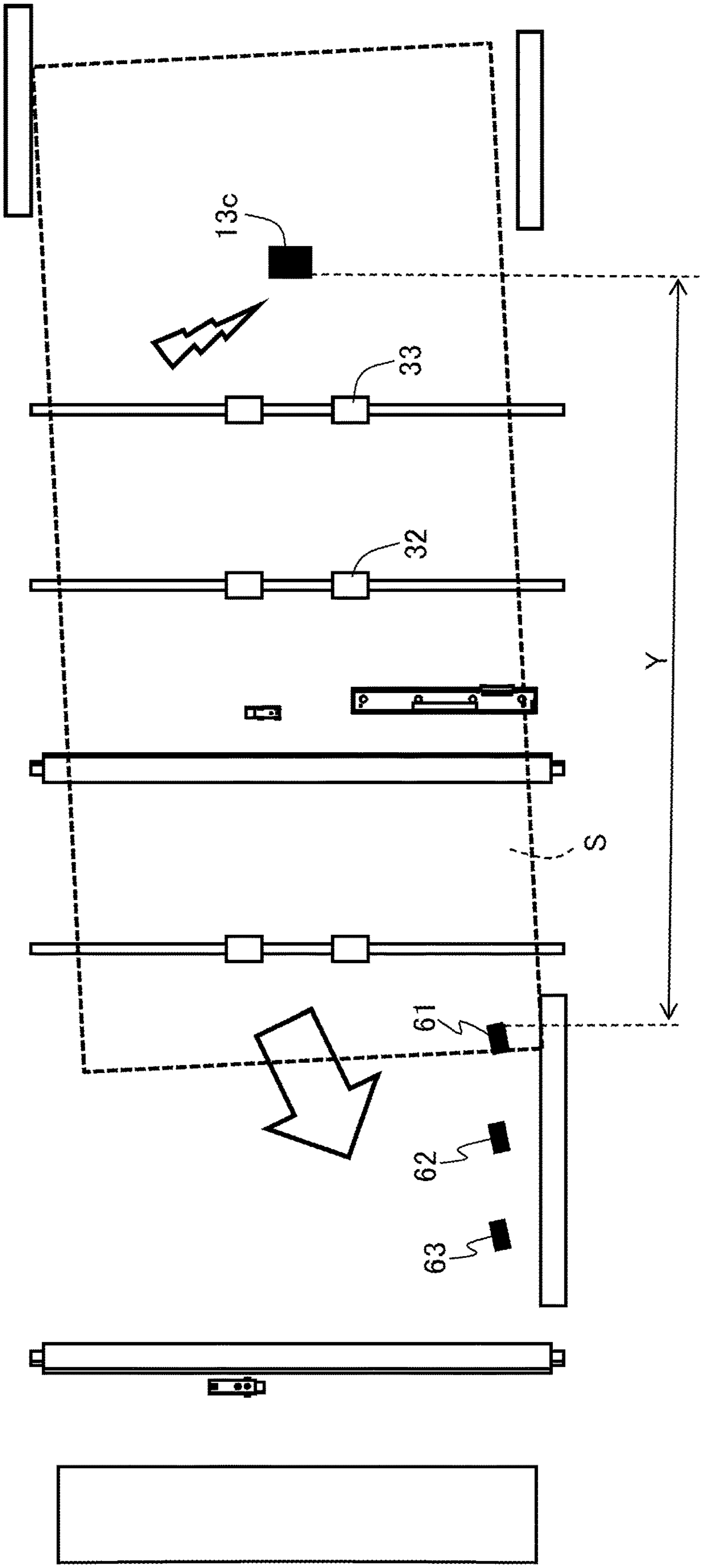
FIG. 12 is a plan view illustrating a state in which the skew correction of the long sheet is performed by the second skew correcting portion.

Regarding the long sheet that exceeds 30 inches, the reason why it is not possible to obliquely convey the sheet by the second skew correcting portion 60 will be described using FIG. 12. FIG. 12 is a diagram illustrating a state in which obliquely conveying of the long sheet is started. At a time when obliquely conveying of the sheet is started upon the arrival of the leading edge of the sheet at the obliquely conveying roller pairs 61, 62, and 63, a trailing edge of the sheet is in a state of being nipped by the separation roller pair 13*c*. If obliquely conveying of the sheet by the obliquely conveying roller pairs 61, 62, and 63 is started in this state, while a side of the leading edge of the sheet S tries to be conveyed obliquely, a side of the trailing edge of the sheet S is in a state of being nipped by the separation roller pair 13*c*, so that the wrinkles and folds occur in the sheet S. In the case of the not-long sheet, the trailing edge of the sheet S is not nipped by the separation roller pair 13*c*. That is, the trailing edge of the sheet S is positioned in a position of not being nipped by the separation roller pair 13*c* but, instead, being nipped by the conveyance roller pairs 32 and 33. In this case, since the conveyance roller pairs 32 and 33 can make transition between the nipping state and the non-nipping state, it is possible to correct the skew of the sheet S by the second skew correcting portion 60.

Further, when a plurality of sheets of the sheet S are fed, the separation roller pair 13*c* cannot make the transition from the nipping state to the non-nipping state. The reason for this is because the separation roller pair 13*c* has a function of separating the plurality of sheets of the sheet S loaded on the loading tray 11*c* into one sheet at a time. If the separation roller pair 13*c* is brought into the non-nipping state, there is a possibility that a succeeding sheet is also conveyed in conjunction with the conveyance of a preceding sheet. The conveyance of the succeeding sheet in conjunction with the preceding sheet is a so-called double feeding phenomenon, and means defective conveyance. Therefore, in a case of conveying the plurality of sheets of the sheet S, it is not possible to bring the separation roller pair 13*c* into the non-nipping state. While, if a section of the conveyance roller pairs 32 and 33 is enlarged in the sheet conveyance direction, it is possible to perform the skew correction of the long sheet by the second skew correcting portion 60, it obviously leads to an increase in the size of the apparatus.

Further, in the present embodiment, the sheet S that exceeds 30 inches in length is referred to as the long sheet. Thereby, it is possible to set a distance Y from the separation roller pair 13*c* to the obliquely conveying roller pair 61 at 30 inches. That is, in a case of a sheet with a length exceeding 30 inches, the trailing edge of the sheet S is nipped by the separation roller pair 13*c* at a time of starting obliquely conveying. On the other hand, in case of a sheet with a length shorter than 30 inches, the trailing edge of the sheet S is not nipped by the separation roller pair 13*c* at the time of starting obliquely conveying.

While, in the present embodiment, the second skew correcting portion 60 uses an obliquely conveying registration unit as a skew correcting unit, it is not limited to this. With respect to the second skew correcting portion 60, it is not limited only to a method using the obliquely conveying registration unit, and acceptable to apply, for example, also a speed difference-based registration method or a swing shift-based registration method. That is, any active registration method that corrects the skew of the sheet while conveying the sheet (active) can be applied to the second skew correcting portion.

Figure 13:
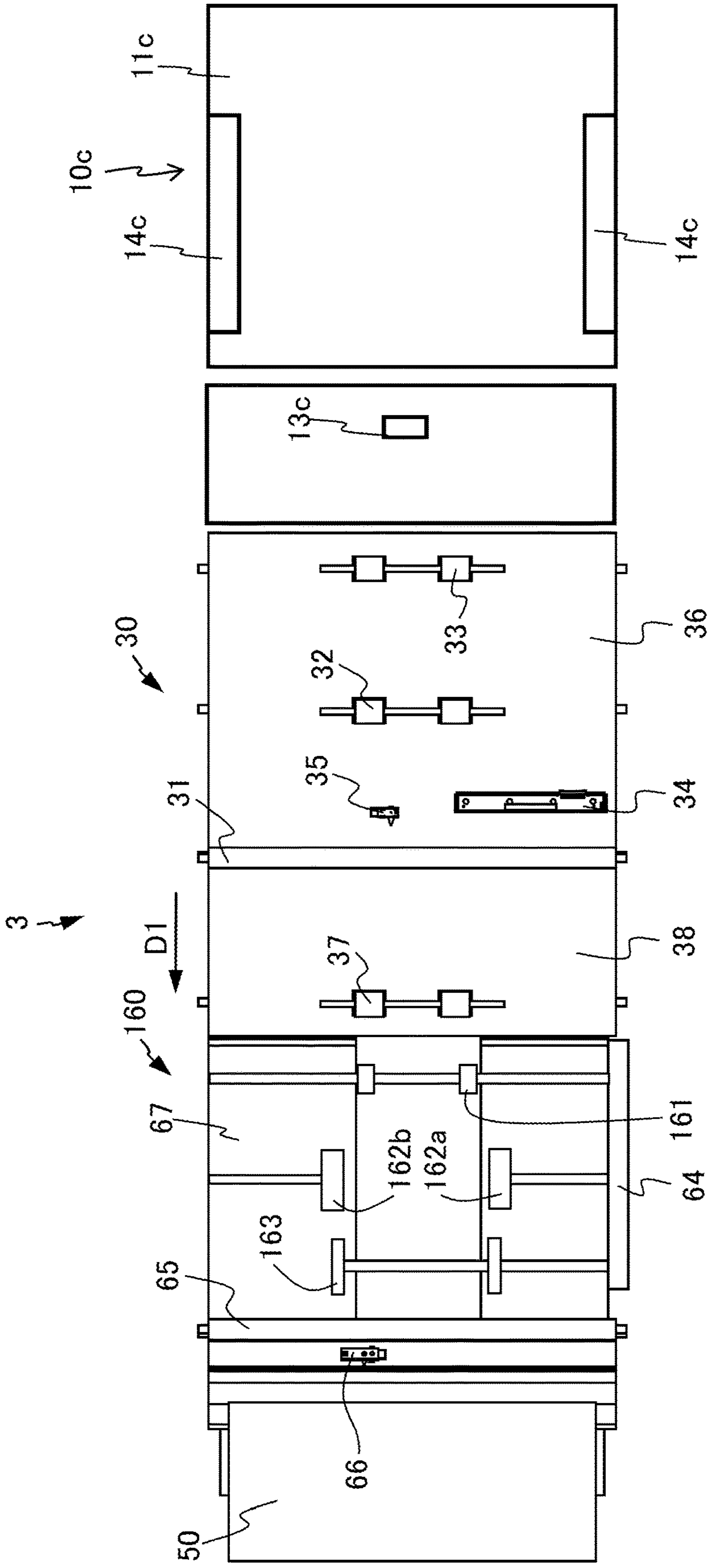
FIG. 13 is a plan view illustrating a case of a regi unit in which a speed difference-based registration method is applied as a second skew correcting portion.

For example, the speed difference-based registration method will be described using FIG. 13. FIG. 13 is a plan view illustrating a case of a regi unit in which the speed difference-based registration method is applied as a second skew correcting portion 160. The second skew correcting portion 160 includes, sequentially from the upstream side in the sheet conveyance direction, a first conveyance roller pair 161, a second conveyance roller pair 162*a* and third conveyance roller pair 162*b*, and a fourth conveyance roller pair 163. The second and third conveyance roller pairs 162*a* and 162*b* are arranged on the same axis but driven by different motors, so that it is possible to drive these roller pairs independently from each other. When the sheet S has conveyed to the second skew correcting portion 160, the sheet S is further conveyed by the first conveyance roller pair 161, and reaches to the second and third conveyance roller pairs 162*a* and 162*b*. At this time, based on a detection result of a sensor, not shown, a degree of the skew of the sheet S is judged, and, accordingly, a rotational speed of each of the second and third conveyance roller pairs 162*a* and 162*b* is changed. For example, control of such as maintaining the rotational speed of the second conveyance roller pair 162*a* at constant and decelerating the rotational speed of the third conveyance roller pair 162*b* is performed. Thereby, the sheet S is conveyed to the fourth conveyance roller pair 163 after corrected the skew of the sheet S. According to this second skew correcting portion 160, it is possible to correct the skew without stopping the sheet S.

Figure 14:
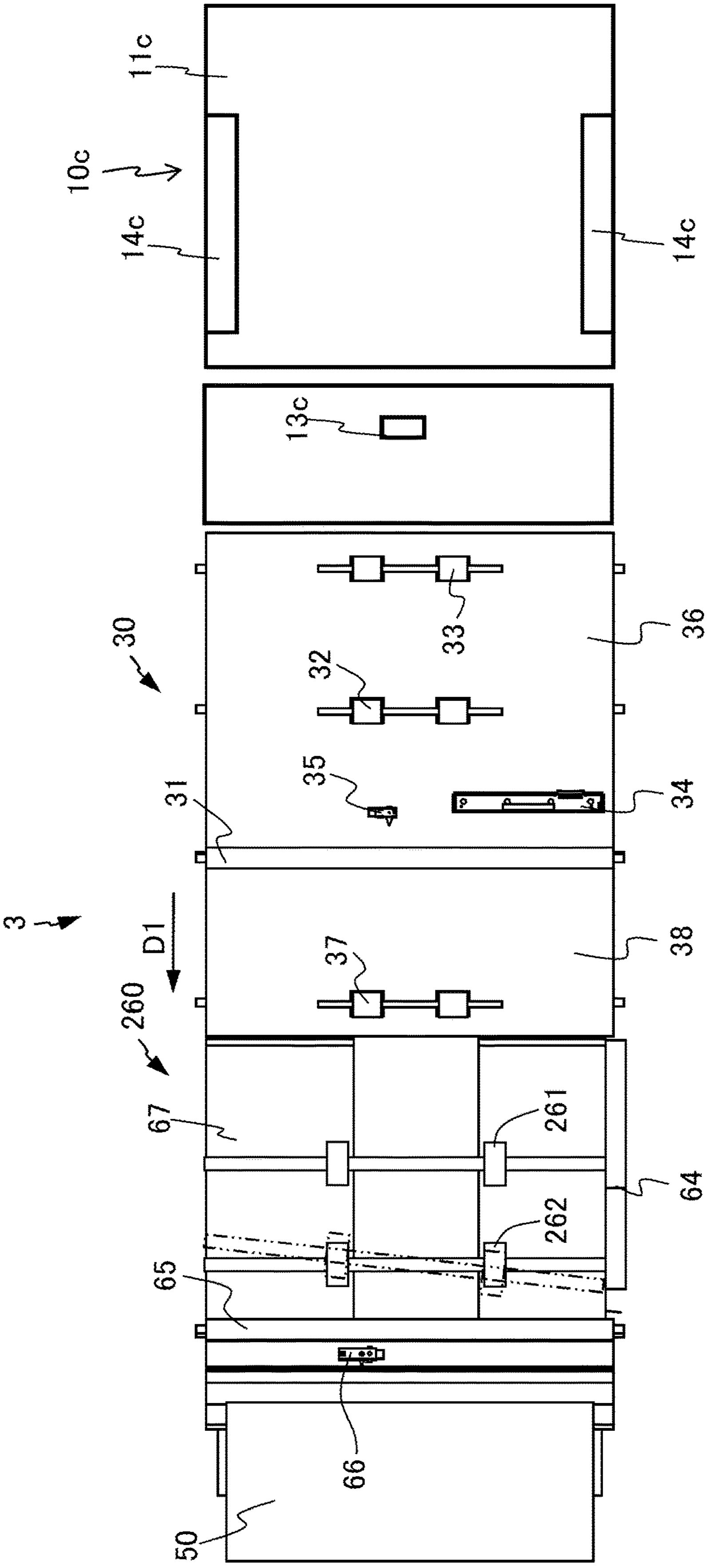
FIG. 14 is a plan view illustrating a case of a regi unit in which a swing shift-based registration method is applied as a second skew correcting portion.

Next, the swing shift-based registration method will be described using FIG. 14. FIG. 14 is a plan view illustrating a case of a regi unit in which the swing shift-based registration method is applied as a second skew correcting portion 260. The second skew correcting portion 260 includes, sequentially from the upstream side in the sheet conveyance direction, a conveyance roller pair 261 and a swing shift roller pair 262. The swing shift roller pair 262 is pivotable (capable of swinging) around an axis in a direction perpendicular to a sheet surface as a center and movable (shiftable) in the width direction, and controlled by the control unit 200. When the sheet S has conveyed to the second skew correcting portion 260, the sheet S is further conveyed by the conveyance roller pair 261, and reaches the swing shift roller pair 262. At this time, based on a detection result of a sensor, not shown, a degree of the skew of the sheet S is judged, and, accordingly, the swing shift roller pair 262 swings and shifts. Thereby, the sheet S is conveyed to a downstream roller pair in the sheet conveyance direction after corrected the skew of the sheet S. According to this second skew correcting portion 260, it is possible to correct the skew without stopping the sheet S.

In the present embodiment, in the case of conveying the long sheet, in the first skew correcting operation performed by the first skew correcting portion 30, the control unit 200 starts the rotation of the pre-regi roller pair 31 in a timing corresponding to a timing of the image formation performed by the image forming unit 40. The timing here is, for example, a timing in which the toner image reaches the secondary transfer nip T2.

Here, since, when performing the registration correction by abutting the sheet against the pre-regi roller pair 31, it is necessary to once stop the sheet S, there is a possibility of, at a time of continuous sheet passing, widening a distance between the sheets and decreasing productivity. To avoid this, after the registration correction of the sheet S has been completed, it is desirable to shorten the distance between the sheets by accelerating a conveyance speed of the sheet S to a speed faster than a transfer conveyance speed. That is, for example, in the case of conveying the not-long sheet, the control unit 200 conveys the sheet at a first speed in the second skew correcting portion 60. On the other hand, in the case of conveying the long sheet, the control unit 200 passes the sheet through the second skew correcting portion 60 at a second speed that is faster than the first speed. Thereby, even in the case of conveying the long sheet, in comparison with a case of conveying at the first speed, it is possible to shorten the distance between the sheets and reduce a decrease in the productivity. As an example of the second speed, for example, it is possible to apply a speed that is about several tens of percent faster than the conveyance speed of the sheet in the secondary transfer nip T2.

As illustrated in FIG. 10B, a distance of the sheet conveyance path from the pre-regi roller pair 31 to the secondary transfer nip T2 is referred to as a distance X. As illustrated in FIGS. 10A and 10B, since, in the present embodiment, the pre-regi roller pair 31 is arranged upstream of the obliquely conveying roller pairs 61, 62, and 63 in the sheet conveyance direction, it is possible to ensure sufficient length for the distance X so as to accelerate the sheet S which has been once stopped. On the other hand, in a case where the pre-regi roller pair 31 is arranged downstream of the obliquely conveying roller pairs 61, 62, and 63, it is not possible to ensure the sufficient length for the distance X so as to accelerate the sheet S which has been once stopped. Therefore, in comparison with the case where the pre-regi roller pair 31 is arranged downstream of the obliquely conveying roller pairs 61, 62, and 63, the distance between the sheets is more easily shortened, and, by reducing the decrease in the productivity, it is possible to improve the productivity.

Processing Steps of Registration Correction

Figure 11:
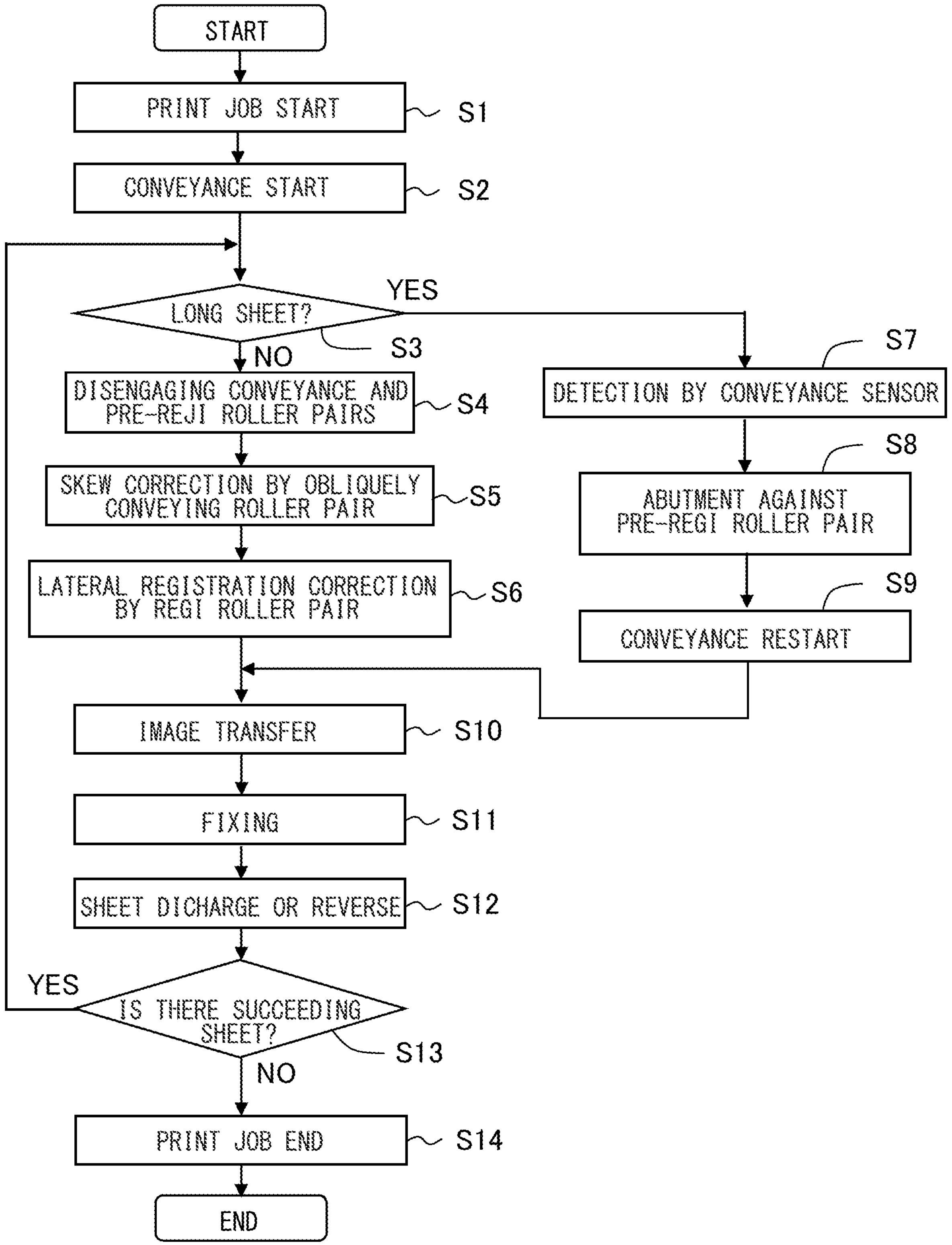
FIG. 11 is a flowchart illustrating processing steps performed at a time of conveying the sheet by the regi unit of the embodiment.

Processing steps of the registration correction in the present disclosure will be described using a flowchart illustrated in FIG. 11. First, upon receiving print execution instructions from a user via, for example, the computer 300, the control unit 200 starts the print job (STEP 51). Along with the instructions of the number of print copies, the user can also specify such as the type of the sheet to be used for the printing.

The control unit 200 starts feeding the sheet S (STEP S2), and identifies whether or not the type of the sheet in the print job is the long sheet (STEP S3). In a case where the control unit 200 judges that the sheet S is not the long sheet and the not-long sheet (STEP S3: NO), the control unit 200 brings the conveyance roller pairs 32 and 33 and the pre-regi roller pair 31 into the non-nipping state by disengaging the conveyance roller pairs 32 and 33 and the pre-regi roller pair 31 (STEP S4), and corrects the skew and the lateral registration by the obliquely conveying roller pairs 61, 62, and 63 (STEP S5). Thereafter, by the regi roller pair 65, a final lateral registration position of the sheet S is moved so as to align with the image position (STEP S6).

On the other hand, in a case where the control unit 200 judges that the sheet S is the long sheet (STEP S3: YES), the leading edge of the sheet S is detected by the conveyance sensor 35 (STEP S7). Based on a detection timing of the conveyance sensor 35, the control unit 200 corrects the skew by abutting the leading edge of the sheet S against the pre-regi roller pair 31 (STEP S8). Then, the control unit 200 resumes the conveyance of the sheet S, which has been once stopped, to the downstream side in the sheet conveyance direction so as to align with a timing in which the toner image reaches the secondary transfer nip T2 (STEP S9).

Thereafter, in both cases of the sheet S of the not-long sheet and the long sheet, the control unit 200 transfers the image in the secondary transfer nip T2 (STEP S10). Further, the control unit 200 performs fixing (STEP S11), and, depending on the print job, either discharges or reverses the sheet (STEP S12), and judges whether or not there is the succeeding sheet (STEP S13). In a case where the control unit 200 judges that there is the succeeding sheet (STEP S13: YES), the control unit 200 again identifies whether or not the type of the sheet in the print job is the long sheet (STEP S3). In a case where the control unit 200 judges that there is not the succeeding sheet (STEP S13: NO), the control unit 200 ends the print job (STEP S14).

To be noted, while, in the present embodiment, for example, in the case of conveying the not-long sheet, the processing of the skew correction by the first skew correcting portion 30 is not performed, it is not limited to this, and, even if the sheet is the not-long sheet, it is acceptable to perform the processing of the skew correction by the first skew correcting portion 30. Thereby, for example, even in a case of conveying such as a special sheet (for example, such as thin paper and cardboard) for which there is a possibility of a decrease in the accuracy of the skew correction by the second skew correcting portion 60, it is possible to perform the skew correction by the first skew correcting portion 30 with high accuracy. That is, correcting the skew of the not-long sheet in the second skew correcting portion 60, while correcting the skew of the long sheet in the first skew correcting portion 30, as described in the present embodiment, is a merely an example.

As described above, according to the printer 1 of the present embodiment, the first skew correcting portion 30 is arranged upstream of the second skew correcting portion 60 in the sheet conveyance direction D1. Therefore, since, at a time of conveying the long sheet, the obliquely conveying roller pairs 61, 62, and 63 do not perform the skew correction, it is possible to suppress the occurrence of the wrinkles, folds and skew. Further, it becomes unnecessary to provide a separation drive configuration to all of the plurality of conveyance roller pairs, it is possible to avoid a cost increase due to an increase in the number of components, the increase in the size of the apparatus, and an increase in sequence complexity. As described above, by performing the registration correction of the long sheet by the pre-regi roller pair 31, it is possible to correct the posture of the sheet with high accuracy. Therefore, while suppressing the increases in the size of the apparatus and costs, it is possible to correct the skew of the sheet with high accuracy.

Further, according to the printer 1 of the present embodiment, the pre-regi roller pair 31 is arranged upstream of the second skew correcting portion 60 in the sheet conveyance direction. Therefore, in comparison with the case where the sheet is abutted against a roller pair arranged downstream of the obliquely conveying roller pairs, it is possible to lengthen the distance between the pre-regi roller pair 31 and secondary transfer nip T2. Since, thereby, it is possible to provide a long acceleration section from the pre-regi roller pair 31 to the secondary transfer nip T2, it is possible to shorten a sheet gap generated corresponding to a stoppage time of the sheet which has been once stooped at the pre-regi roller pair 31. Therefore, it becomes possible to reduce the decrease in the productivity.

In the embodiment described above, positions of the CIS 34, the conveyance sensor 35, and the leading edge detection sensor 66 are not limited to the positions described in the present embodiment. That is, these sensors can be arranged in any position upstream of the secondary transfer nip T2 in the conveyance direction such that the skew of the sheet is corrected before the sheet reaches the secondary transfer nip T2.

According to the present embodiment, while suppressing the increases in the size of the apparatus and the costs, it is possible to correct the skew of the sheet with high accuracy.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-122811, filed Aug. 1, 2022 and No. 2023-085501, filed May 24, 2023 which are hereby incorporated by reference herein in their entirety.

What is claimed is:

1. A sheet conveyance apparatus comprising:

a first skew correcting portion including a first roller pair configured to convey a sheet and a second roller pair disposed upstream of the first roller pair in a sheet conveyance direction and configured to convey the sheet, the first skew correcting portion being configured to correct skew of the sheet conveyed by the second roller pair by abutting a leading edge of the sheet against the first roller pair so as to form a bend in the sheet;

a second skew correcting portion including a turning roller pair configured to convey another sheet, the second skew correcting portion being configured to correct skew of the another sheet by conveying the another sheet with a turning motion using the turning roller pair;

an acquisition unit configured to acquire information on length of a sheet to be conveyed; and a control unit configured to control the first skew correcting portion and the second skew correcting portion based on the information on the length of the sheet to be conveyed acquired by the acquisition unit, wherein, in a case where a first sheet with a length of a first length is to be conveyed, the control unit is configured to correct the skew of the first sheet by the second skew correcting portion, and wherein, in a case where a second sheet with a length of a second length that is longer than the first length is to be conveyed, the control unit is configured to correct the skew of the second sheet by the first skew correcting portion, and configured not to correct the skew of the second sheet by the second skew correcting portion.

2. The sheet conveyance apparatus according to claim 1, wherein the second skew correcting portion is disposed downstream of the first skew correcting portion in the sheet conveyance direction.

3. The sheet conveyance apparatus according to claim 1, wherein, in a case where the second sheet whose length in the sheet conveyance direction is longer than a predetermined length is to be conveyed, the control unit is configured to correct the skew of the second sheet by the first skew correcting portion, and wherein, in a case where the first sheet whose length in the sheet conveyance direction is equal to or less than the predetermined length is to be conveyed, the control unit is configured to correct the skew of the first sheet by the second skew correcting portion.

4. The sheet conveyance apparatus according to claim 3, wherein the predetermined length is 30 inches.

5. The sheet conveyance apparatus according to claim 3, wherein the second skew correcting portion includes a contact surface extending along the sheet conveyance direction, wherein the contact surface is configured to come into contact with an end in a width direction perpendicular to the sheet conveyance direction of the sheet that is conveyed, wherein the turning roller pair includes an obliquely conveying roller pair configured to move the sheet in a direction inclined with respect to the sheet conveyance direction so as to approach the contact surface with respect to the width direction toward a downstream side in the sheet conveyance direction, wherein the second skew correcting portion is configured to convey the sheet by moving the sheet along the contact surface using the obliquely conveying roller pair to correct the skew of the sheet, wherein the obliquely conveying roller pair is configured to be changed between a nipping conveying state in which the sheet is nipped and conveyed and a non-nipping state in which a nip of the sheet is released, and wherein, in the case where a sheet whose length in the sheet conveyance direction is longer than the predetermined length, the control unit is configured to change the obliquely conveying roller pair into the non-nipping state.

6. The sheet conveyance apparatus according to claim 3, wherein the second skew correcting portion is disposed upstream of an image forming unit in the sheet conveyance direction, and wherein, in the case where a sheet whose length in the sheet conveyance direction is longer than the predetermined length, in a skew correcting operation by the first skew correcting portion, the control unit is configured to start rotation of the first roller pair in a timing corresponding to a timing of image formation by the image forming unit.

7. The sheet conveyance apparatus according to claim 3, wherein the second skew correcting portion includes a contact surface extending along the sheet conveyance direction, wherein the contact surface is configured to come into contact with an end in a width direction perpendicular to the sheet conveyance direction of the sheet that is conveyed, wherein the turning roller pair includes an obliquely conveying roller pair configured to move the sheet in a direction inclined with respect to the sheet conveyance direction so as to approach the contact surface with respect to the width direction toward a downstream side in the sheet conveyance direction, wherein the second skew correcting portion is configured to convey the sheet by moving the sheet along the contact surface using the obliquely conveying roller pair so as to correct the skew of the sheet, wherein the first roller pair is configured to be changed between a nipping conveying state in which the sheet is nipped and conveyed and a non-nipping state in which a nip of the sheet is released, and wherein, in the case where a sheet whose length in the sheet conveyance direction is equal to or less than the predetermined length, the control unit is configured to convey the sheet by changing the first roller pair into the nipping conveying state, and, after the leading edge of the sheet has reached the obliquely conveying roller pair, the control unit is configured to change the first roller pair into the non-nipping state.

8. The sheet conveyance apparatus according to claim 7, wherein the second roller pair is configured to be changed between the nipping conveying state in which the sheet is nipped and conveyed and the non-nipping state in which the nip of the sheet is released, and wherein, in the case where a sheet whose length in the sheet conveyance direction is equal to or less than the predetermined length, after the leading edge of the sheet that was conveyed by the first roller pair has reached the obliquely conveying roller pair, the control unit is configured to change the second roller pair into the non-nipping state.

9. The sheet conveyance apparatus according to claim 3, wherein the second skew correcting portion includes a contact surface extending along the sheet conveyance direction, wherein the contact surface is configured to come into contact with an end in a width direction perpendicular to the sheet conveyance direction of the sheet that is conveyed, wherein the turning roller pair includes an obliquely conveying roller pair configured to move the sheet in a direction inclined with respect to the sheet conveyance direction so as to approach the contact surface with respect to the width direction toward a downstream side in the sheet conveyance direction, wherein the second skew correcting portion is configured to convey the sheet by moving the sheet along the contact surface using the obliquely conveying roller pair to correct the skew of the sheet, wherein the second skew correcting portion includes a third roller pair disposed downstream of the obliquely conveying roller pair in the sheet conveyance direction and a moving unit configured to move the third roller pair in the width direction, wherein, in a skew correcting operation by the second skew correcting portion, the control unit is configured to control such that the third roller pair nips the sheet that is moved along the contact surface, and control such that the moving unit corrects a position of the sheet that is nipped by the third roller pair in the width direction, wherein the second skew correcting portion is disposed upstream of an image forming unit in the sheet conveyance direction, and wherein, in the case where a sheet whose length in the sheet conveyance direction is equal to or less than the predetermined length, in a skew correcting operation by the second skew correcting portion, the control unit is configured to control such that a sheet conveyance speed of the third roller pair is changed in a timing corresponding to a timing of image formation by the image forming unit.

10. The sheet conveyance apparatus according to claim 1, wherein the second skew correcting portion includes a contact surface extending along the sheet conveyance direction, wherein the contact surface is configured to come into contact with an end in a width direction perpendicular to the sheet conveyance direction of the sheet that is conveyed, wherein the turning roller pair includes an obliquely conveying roller pair configured to move the sheet in a direction inclined with respect to the sheet conveyance direction, the direction being inclined so as to approach the contact surface with respect to the width direction toward a downstream side in the sheet conveyance direction, and wherein the second skew correcting portion is configured to convey the sheet by moving the sheet along the contact surface using the obliquely conveying roller pair to correct the skew of the sheet.

11. The sheet conveyance apparatus according to claim 10, wherein the second skew correcting portion includes a third roller pair disposed downstream of the obliquely conveying roller pair in the sheet conveyance direction and a moving unit configured to move the third roller pair in the width direction, and wherein, in a skew correcting operation by the second skew correcting portion, the control unit is configured to control such that the third roller pair nips the sheet that has been moved along the contact surface, and control such that the moving unit corrects a position of the sheet that is nipped by the third roller pair in the width direction.

12. The sheet conveyance apparatus according to claim 1, wherein the first skew correcting portion includes a bend space portion where a sheet forms a bend by an abutment of the sheet against the first roller pair.

13. An image forming apparatus comprising:

the sheet conveyance apparatus according to claim 1; and an image forming unit configured to form an image on a sheet that has been conveyed by the sheet conveyance apparatus.

14. The image forming apparatus according to claim 13, wherein the image forming unit includes an image bearing member configured to bear a toner image and a transfer unit configured to transfer the toner image borne by the image bearing member onto a sheet, and wherein the sheet conveyance apparatus is configured to convey the sheet to the transfer unit.

* * * * *